Jan. 28, 1930.  J. HOLAN  1,745,299
BULLETPROOF WINDOW FOR ARMORED CARS
Filed Dec. 23, 1926  2 Sheets-Sheet 1
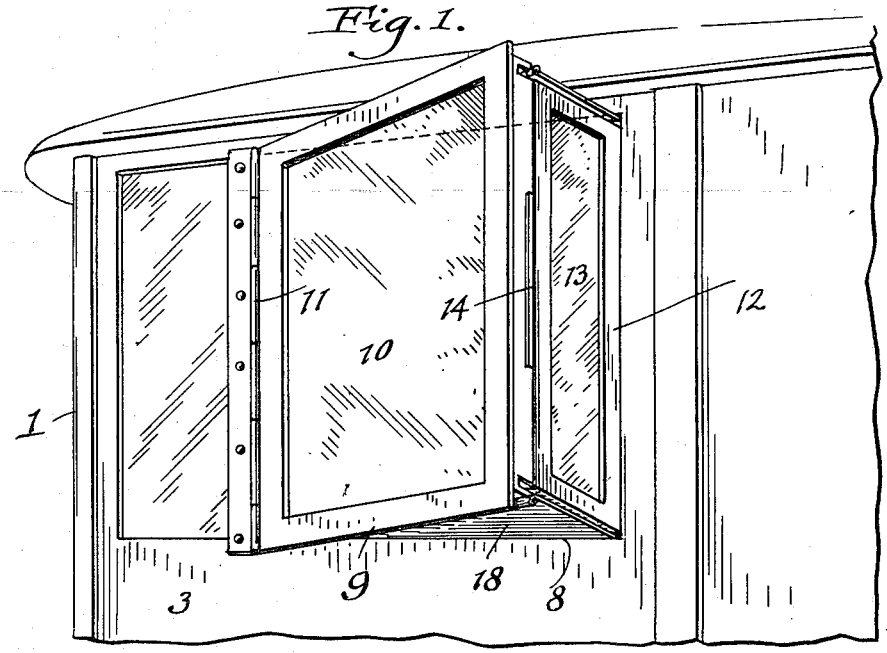
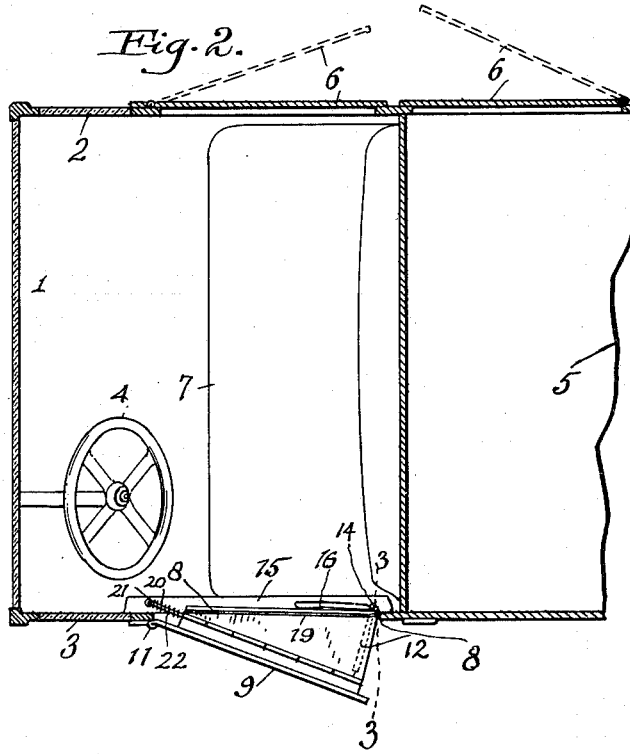
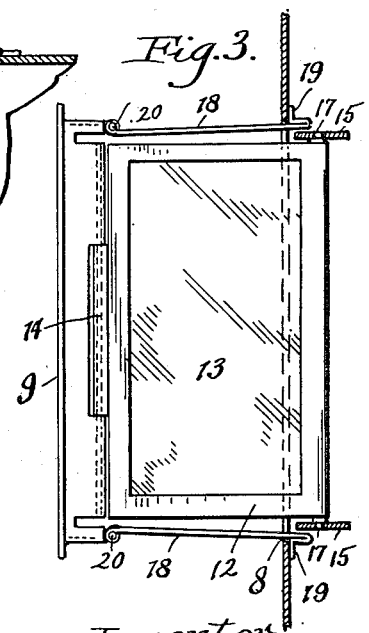
Inventor:
James Holan.
Kwis Hudson + Kent
Attys.

Jan. 28, 1930.  J. HOLAN  1,745,299
BULLETPROOF WINDOW FOR ARMORED CARS
Filed Dec. 23, 1926  2 Sheets-Sheet 2
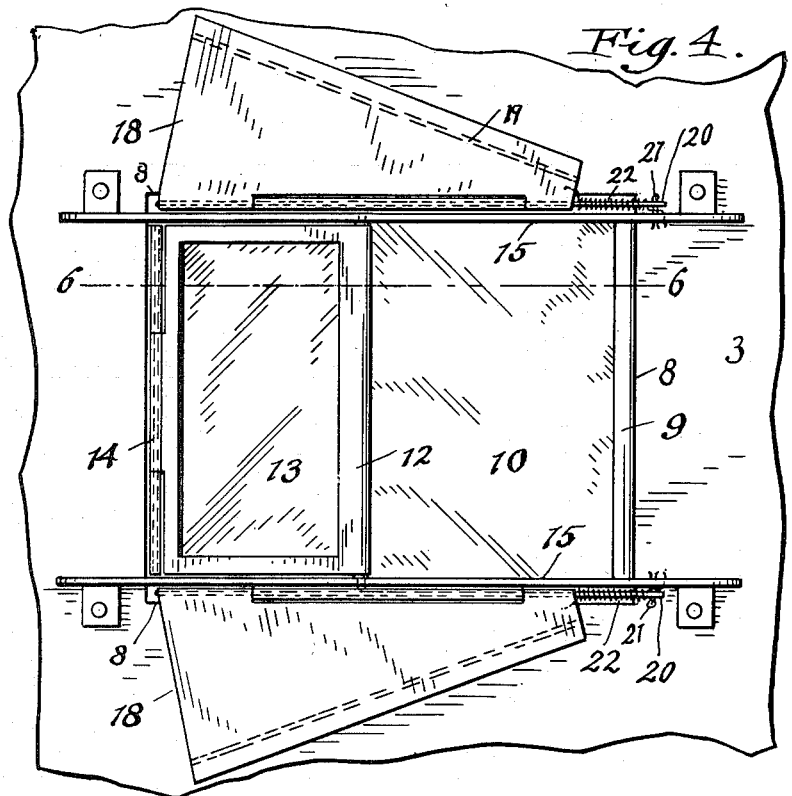
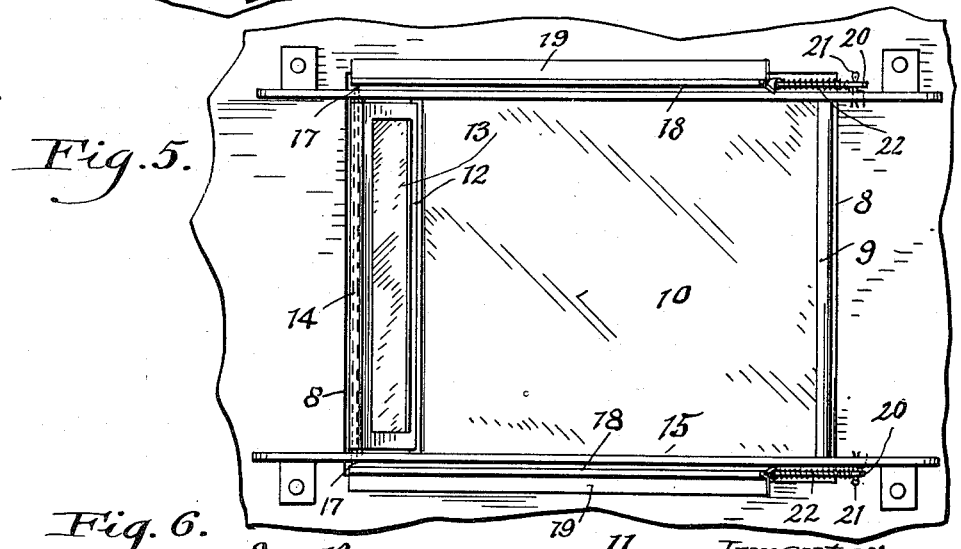
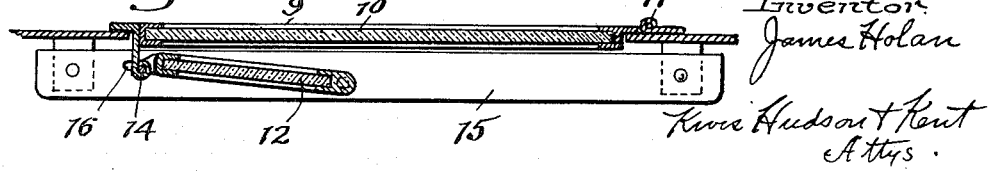

Patented Jan. 28, 1930

1,745,299

UNITED STATES PATENT OFFICE

JAMES HOLAN, OF CLEVELAND, OHIO

BULLETPROOF WINDOW FOR ARMORED CARS

Application filed December 23, 1926. Serial No. 156,625.

This invention relates to bullet-proof windows for armored cars, such as used for transferring money and other valuables, and has for its object to provide a bullet-proof window which can be adjusted to open position and which serves in its open position as well as in its closed position as a shield to prevent entry of bullets or bombs into the interior of the car.

A further object is to provide a bullet-proof window in the side wall of the car alongside the driver's seat which can be adjusted outwardly to permit the driver to look backwardly along the exterior of the car without exposing himself to the gun fire of robbers.

With the above and other objects in view, the invention may be said to comprise the device as illustrated in the accompanying drawings hereinafter described and particularly set forth in the appended claims, together with such variations and modifications thereof as will be apparent to those skilled in the art to which the invention appertains.

Reference should be had to the accompanying drawings forming a part of this specification, in which:

Fig. 1 is a perspective view showing the window in open position;

Fig. 2 is a horizontal section through the car body taken in a plane above the window;

Fig. 3 is a vertical section on line 3—3 of Fig. 2, showing the window in open position;

Fig. 4 is a side elevation of the window looking from the inside of the car and showing the window in closed position;

Fig. 5 is an elevation similar to Fig. 4, showing the window in open position; and Fig. 6 is a section on line 6—6 of Fig. 4.

Referring to the accompanying drawings, the car body 1 is provided with side walls 2 and 3, and at the forward end of the body there is a driver's compartment 4, the space behind the driver's compartment forming a compartment 5 in which the valuables are carried. The walls of the car body are formed of armor-plate or other bullet-proof material, and the windows at the front and sides of the driver's compartment are formed of bullet-proof glass. The right-hand wall 2 adjacent the forward end of the car is provided with doors 6 by means of which entry may be had to the compartments 4 and 5. The compartment 4 is provided with the usual driver's seat 7, and in the left-hand wall 3 alongside the driver's seat there is a window opening 8 in which there is mounted a main window 9 which is of a size to close the opening 8, the window having a sash in which there is mounted a bullet-proof glass panel 10 and being hinged along its forward edge to the vertical forward edge of the window opening 8 by means of a suitable hinge 11. An auxiliary window 12 having a sash in which there is mounted a bullet-proof panel 13 is connected to the rear vertical edge of the window 9 by means of a hinge 14 and is adapted, when the main window is in closed position, to lie against the inner face of the main window 9. When the main window 9 is swung outwardly about its hinge 11, the auxiliary window 12 can swing about its hinge 14 and be held in engagement with the rear edge of the window opening to close the space between the rear edge of the main window 9 and the wall of the car.

Substantially flat guide bars 15 extend along the inner side of the window opening, one slightly below the top of the opening and the other slightly above the bottom thereof, and these bars are provided with longitudinal slots 16 which receive pins 17 projecting from the inner corners of the auxiliary window 12. The pin and slot connection between the auxiliary window and guide bars serves to limit the outward movement of the main window and to cause the auxiliary window to move to a position parallel with the main window when the main window is moved to closed position.

It is desirable that the openings between the upper and lower edges of the main window and the wall of the car body be closed when the window is in open position to prevent any one from tossing a bomb through either of these openings and to this end guard plates 18 are hinged to the upper and lower sash bars of the main window and extend through the window opening above and below the upper and lower guide bars 15. The guard plates 18 are of triangular form and of a size to cover the openings at the top and bottom of the window when the same is in open position and each plate has its inner edge bent back upon itself and outwardly to provide a flange 19 spaced from the inner edge and adapted to bear against the inner face of the wall adjacent the window opening when the window is in open position. When the window is in open position, the inner edge portions of the plates 18 bear against the upper and lower faces of the upper and lower guide bars 15 with their flanges 19 in contact with the wall so that the inner edges of the plates are firmly anchored.

The plates 18 are connected to the main window 9 by means of pintle rods 20 which project forwardly beyond the forward ends of the plates and are pivotally connected to the guide bars 15 by means of loose pins 21 which permit a slight longitudinal movement of the rods during opening and closing movements of the window and coil springs 22 are mounted on said rod and connected at their opposite ends to the guide bars and to the plates. The springs 22 are under torsion and exert a turning force on the plates 18 in a direction to cause the plates to swing toward the wall as the window is moved to closed position so that the plates are held flat against the side walls when the window is closed. The lower plate tends to move by gravity to vertical position against the wall and the spring is not necessary to cause the folding of the lower plate but it is desirable to provide the spring in connection with both plates in order to assist in the movement of the window to closed position.

The hinged window may be opened to provide freer circulation of air through the driver's compartment or for the purpose of permitting the driver to look rearwardly along the exterior of the car, as is desirable when backing up to a platform. The window of the present invention permits the driver to put his head through the window opening to look rearwardly along the exterior of the car without exposing himself to gun fire or bombs since, when the window is in its open position, the driver is protected by the main window 9 and by the auxiliary window 12 closing the space between the rear edge of the window 9 and the wall of the car body.

Having thus described my invention, I claim:

1. In an armored car having a wall provided with a window opening, a main bullet-proof window adapted to close said opening and mounted to swing about a vertical axis, and an auxiliary bullet-proof window connected to a vertical edge of the main window and adapted to close the space between the said edge and said wall when the main window is in open position.

2. In an armored car having a wall provided with a window opening, a main bullet-proof window adapted to close said opening and mounted to swing about a vertical axis, and an auxiliary bullet-proof window hinged to a vertical edge of said main window and adapted to close the space between said edge and said wall when the main window is in open position.

3. In an armored car having a side wall provided with a window opening in the forward portion thereof alongside the driver's seat, a main window adapted to close said opening and comprising a sash having a bullet-proof glass panel, said sash being hinged at its forward edge to swing outwardly, and an auxiliary sash hinged to the rear edge of said main window sash and adapted to close the space between the rear edge thereof and the rear edge of the window opening when the window is in open position, said auxiliary sash having a bullet-proof glass panel.

4. In an armored car having a wall provided with a window opening, a main bullet-proof window adapted to close said opening and mounted to swing about a vertical axis, an auxiliary bullet-proof window hinged to a vertical edge of said main window and adapted to close the space between said edge and said wall when the window is in open position, and a guide for the inner edge of said auxiliary window extending alongside the window opening.

5. In an armored car having a wall provided with a window opening, a main bullet-proof window adapted to close said opening and mounted to swing about a vertical axis, an auxiliary bullet-proof window hinged to a vertical edge of said main window and adapted to close the space between said edge and said wall when the window is in open position, guard plates hinged to the upper and lower edges of the main window, and means for supporting said plates in horizontal position when the window is in open position.

6. In an armored car having a wall provided with a window opening, a main bullet-proof window adapted to close said opening and mounted to swing about a vertical axis, an auxiliary bullet-proof window hinged to a vertical edge of said main window and adapted to close the space between said edge and said wall when the window is in open position, horizontal guide bars extending along the inner side of the window opening adjacent the top and bottom thereof, said bars having longitudinal slots, and pins on said auxiliary window slidable in said slots.

7. In an armored car having a wall provided with a window opening, a main bullet-proof window adapted to close said opening, said window being hinged to a vertical edge of said opening, an auxiliary bullet-proof window hinged to the free edge of the main window and adapted to close the space between said edge and said wall when the window is open, guard plates extending through the window opening and hinged to the upper and lower edges of the main window, and means for supporting said guard plates in in horizontal position when the window is open and for shifting said plates to vertical positions against the wall when the window is closed.

In testimony whereof, I hereunto affix my signature.

JAMES HOLAN.